Jan. 13, 1953   H. J. GRAHAM   2,625,638
WELDING SYSTEM
Filed Sept. 2, 1950
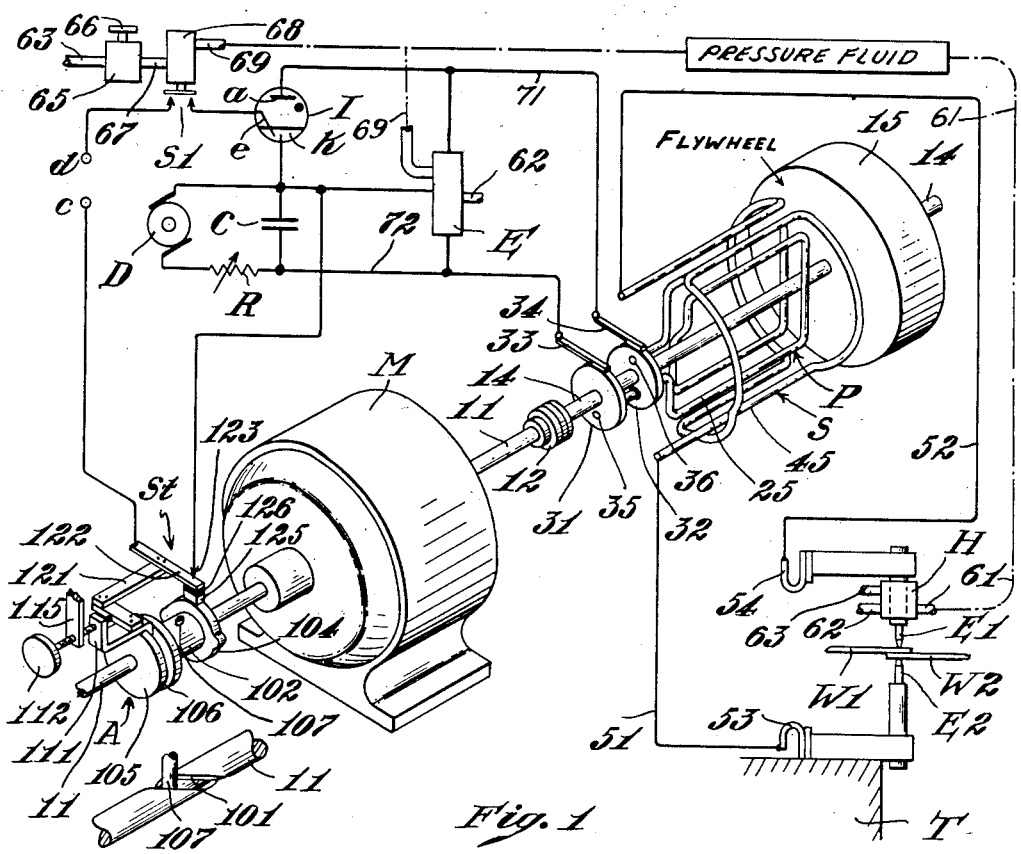
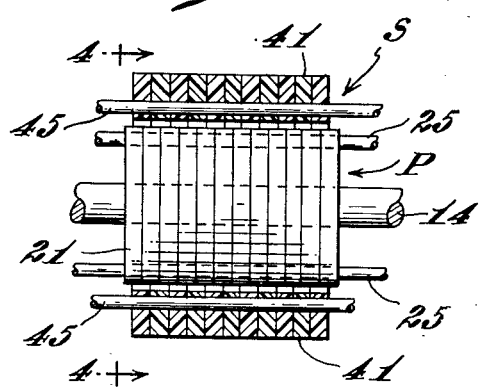
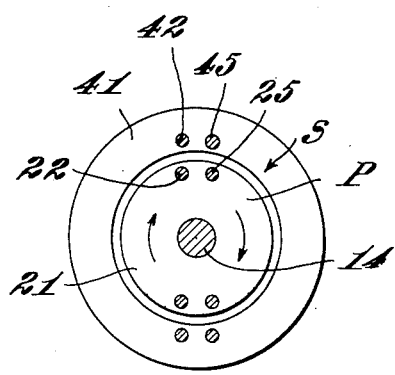
Inventor
Harold J. Graham
by Roberts, Cushman & Grover
Att'ys Patented Jan. 13, 1953

2,625,638

UNITED STATES PATENT OFFICE 2,625,638

WELDING SYSTEM

Harold J. Graham, Highland Park, Mich., assignor to Graham Manufacturing Corporation, Ferndale, Mich., a corporation of Michigan Application September 2, 1950, Serial No. 183,060

18 Claims. (Cl. 219—4)

The present invention relates to electric generating and control systems for supplying consecutive current impulses of high intensity, for example by means of a welding tool, to workpieces to be joined.

The principal object of the invention is to provide such an impulse generating system which is comparatively very simple but nevertheless permits cyclic application of current impulses to appropriate electrodes or terminals; to apply these impulses in timed relation with the mechanical cycle of a welding tool incorporating the electrodes; to provide a welding system of this general type which employs a minimum of moving components and control apparatus such as relays or electronic tubes, which is economical as to energy consumption although permitting application of high energy impulses, and which is therefore comparatively inexpensive as to manufacture, operation and maintenance and so rugged and simple that it can be worked by comparatively unskilled operators; and to provide continuous spot welding apparatus of the above type providing for high energy welding steps following each other closely in controlled succession.

It will be understood that, while the system according to the present invention is particularly suitable for welding, it is applicable to manufacturing problems requiring current supply and control of similar nature.

In accordance with one important aspect of the invention, an electrical power supply and control system for applying consecutive energy impulses comprises an inductor unit having primary and secondary windings relatively movable to each other as stator and rotor elements, the secondary being connected to the output terminals such as welding electrodes and the primary being periodically excited from a suitable power supply; the system further comprises a control circuit which correlates the supply of electrical energy to the primary. In a further important aspect of the invention, the above excitation supply is applied in the form of cyclic impulses which can be derived from storing devices, for example capacitor means; the excitation or primary impulses are in timed relation to the relative movement of primary and secondary. In this manner, dynamic and transformer induction effects can be combined. They can be controlled by more or less concentrating the windings.

In another aspect, the above mentioned inductor has a secondary stator winding connected to the electrodes and a primary rotor winding connected through a circuit maker, such as an ignitron, to a capacitor constituting the energy storing excitation power supply, the energization of the control electrode of the ignitron being in timed correlation with the rotary movement of the primary.

In still another aspect, the above timing device is adjustable relatively to the position of the windings, permitting regulation of the time relation of the change of magnetic link between primary and secondary, to their relative movement on the one, and the excitation energy supply to the primary on the other hand.

Another feature of the invention concerns a welding tool having electrodes, which are mechanically, electrically, pneumatically or otherwise coupled with the above mentioned arrangement for exciting the primary, so that the mechanical application of the electrodes to the work pieces can be correlated to the application thereto of electric welding impulses. A further feature of the invention is the possibility of associating the rotating winding with a flywheel arrangement.

Other objects, aspects and features will appear, in addition to those contained in the above statement of the nature and substance including some of the objects of the invention, from the following description of a typical practical embodiment thereof illustrating its novel characteristics. This description refers to a drawing in which Fig. 1 is a diagrammatic representation of the system as a whole, including a welding tool, an inductor with its drive, a power supply, and timing control means;

Fig. 2 is a diagram showing a detail of the shaft as correlated with the timing arrangement;

Fig. 3 is an axial section through the inductor component, with the rotor in elevation; and Fig. 4 is a section on lines 4—4 of Fig. 3.

In Fig. 1, M is a conventional electromotor having a shaft 11 coupled at 12 to the shaft 14 of the rotor or primary component P which also carries a flywheel 15. It will be understood that suitable conventional bearing and lubricating arrangements are provided which have been omitted from the drawing in order to simplify the showing.

The rotor or primary P is fastened to shaft 14 in conventional manner as for example shown in Figs. 3 and 4. Discs 21 are keyed to shaft 14, and provided with holes 22 for receiving the rotor winding proper 25. The excitation or primary current is supplied to winding 25 by means of two slip rings 31 and 32 with brushes 33 and 34, winding 25 being electrically connected to the slip rings at 35 and 36 respectively.

The stator unit S has stator windings 45 suitably supported by a stator body which can be built up of discs 41 with holes 42. The stator body is mounted in conventional manner on a stator frame of suitable conventional design well known in the art.

Depending upon the transformer ratio between the P and S windings, 25 and 45 will comprise a suitable number of turns, which however will in most instances not be very many in view of the fact that machines of this type are to supply heavy current rather than high voltage. In this embodiment, they are so far as possible concentrated.

If the magnetic circuit which inductively links the primary and secondary windings P and S is free of iron, which is preferable in certain instances, then the discs 21 and 41 are made of suitable nonmagnetic material. Plates cut from commercially available plastic material such as Bakelite sheets or blocks are suitable. If the magnetic circuit contains iron, one or more of the discs 21 and 41 are composed of suitably laminated transformer sheets; they can be arranged alternately with nonmagnetic discs, or the entire rotor and stator structure can be composed of conventional, laminated bodies.

The stator S is connected to the electrodes E1 and E2 by conductors 51 and 52 leading to suitable flexible connectors 53 and 54. The work pieces are indicated at W1 and W2. One of the electrodes, for example E2, can be mounted in conventional manner on a table or other support T. One or both of the electrodes can be associated with a holder or holders, such as indicated at H, which in conventional manner permits lifting and lowering of the respective electrode towards the work pieces and the other electrode, pressing them together prior to application of the welding current impulse.

Tool holder or actuator H can be of the pneumatic type such as described in my copending application Serial No. 81,130. It can be supplied with compressed fluid, either air or a suitable liquid, by way of tube 61, while similar tubes 62 and 63 lead for pneumatic control purposes to an excitation relay E and to a control switch actuator 65 with hand or foot operated control member 66, which actuator 65 is in turn pneumatically connected at 67 to the pneumatic actuator 68 of control switch S1. A further pneumatic duct 69 can supply compressed fluid supply to the switch assembly.

The control units S1 and H are so interconnected that switch S1 is closed when proper pressure is established between the electrodes E1 and E2. The control E, which is responsive to the voltage of capacitor C, can be used optionally and is so constructed that it permits or effects closure of S1 upon presence of proper excitation voltage prior to or after circuit completion by ignitron I, by locking unit H from operating unit 68 so long as such voltage does not appear at the voltage responsive actuator of control unit E.

The primary winding 25 is connected through suitable conductors 71 and 72 to a capacitor C, and in series therewith to an ignitron I with anode $a$, cathode $k$, and control electrode $e$.

The capacitor C can be charged by means of a direct current supply indicated at D, which source is connected to capacitor C through a charging resistor R. It will be understood that any convenient direct current source can be used, such as for example an alternating current supplied rectifier circuit.

The igniting electrode $e$ of ignitron I is through switch S1 connected to an auxiliary direct current supply indicated by terminals $d$, $c$. Again any convenient direct current source such as a rectifier or battery can be used at this point.

Further in series with cathode $k$, electrode $e$, switch S1, and terminals $d$, $c$, is a timing switch St, which is constructed and correlated with the rotor component as follows:

The shaft 11 is provided with a helical groove 101 within the sliding sleeve 102 of a timer assembly A. This assembly comprises, mounted on sleeve 102, a cam 104 and flange 105 having a groove 106. As indicated in Fig. 2, the sleeve 102 has a pin 107 which extends inwardly into groove 101. An adjusting guide 111 extends into groove 106 and can be moved axially of the shaft, by suitable means for example an adjusting screw 112 mounted on the holder 115 which is suitably fastened to the frame work of the device for example to motor stand. Also mounted on guide 111 is a switch support 121 carrying a spring switch contact 122 which cooperates with a second switch contact 123 which is suitably fixed relatively to the device. A follower 125 is mounted on contact 122 by means of an insulating block 126. It will be seen that by rotating screw 112, guide member 111 is shifted, rotating cam 104 relatively to shaft 11, by means of groove 101 and pin 107, thus changing the angular or phase relation between the cam projections and the shaft, so that the closing of switch St can be adjusted with relation to the relative position of the stator and rotor windings. It will be noted that the two cam projections shown correspond to the two coincidences of windings 25 and 45. If only one coincidence is utilized, or if an inductor with more than two coincidences is used, the cam is modified accordingly.

In a practical example of the above described installation, the inductor P, S supplies approximately 2.5 kw. expressed in terms of continuous performance rating of the motor M. Such a system is sufficient for the welding of ⅛" steel plates.

In the same example the capacitor C has an approximate rating of 150 volt maximum charge, and 34,000 microfarad.

Although the above described embodiment has a single magnetic circuit linking the single two turn windings of primary and secondary coils, it will be understood that branched magnetic circuits can be used and that single bar inductors as well as coils with more than two windings can be employed, depending upon the dimensions and the speed of the inductor.

The above described embodiment of my invention operates as follows:

With the ignitron nonconductive and the direct current source D connected to capacitor C through resistor R, the capacitor charges to a voltage which is adjustable by means of R or by way of regulating the exciter system of generator D if a generator is used as a current source.

The system consisting of timer A, motor M and inductor P, S rotates continuously, but there is of course no magnetic field induced by P, so long as the ignitron is nonconductive.

When cam 104 lifts contact 122 of timing switch St, assuming that switch S1 is closed, the proper firing voltage derived from $d$, $c$ is applied to control electrode $e$ and the ignitron I becomes conductive. The capacitor C discharges into the primary P and an E. M. F. is induced in secondary S. Due to the concentrated arrangement of the windings and the short time application of the primary current, the welding impulses induced in the secondary are very short although of comparatively high energy, and their amplitude as well as duration and wave configuration can be regulated by means of the voltage applied to capacitor C and the setting of timer A.

In the above mentioned embodiment, the output of the inductor into the welding electrodes can be adjusted to be as high as 10,000 amperes at about 10 volts, during time periods as short as one millisecond.

The above described correlation of the electrode control component H and the switch S1 provides for closing of S1 immediately upon application with proper pressure, of the electrodes to the workpieces. A welding impulse is then discharged through the workpieces so long as S1 remains closed. If S1 remains closed, the impulses repeat in a cycle determined by the charging time of capacitor C and the setting and configuration of cam 104 of timer A. Switch S1 can be opened by way of electrode control H either in timed relation to the position of the electrodes, or by means of relay E if excitation voltage should not be effective at E, dependent upon the condition of the primary circuit. By actuating control member 66, switch S1 can be opened independently of the linkage between the electrode control mechanism and the primary circuit.

It will be noted that induction takes place only when capacitor C discharges through the primary P, regardless of the continuous relative movement of secondary and primary, so that the timing of the welding impulses does not only depend upon the cyclic positional change between the primary and the secondary, but, as an indispensable condition, also upon the discharge of the capacitor C, as timed by the timer assembly A, initiated by the switch S1, and made effective by the contact of the electrodes and the workpieces. Switch S1 can be arranged to open when electrode E1 is lifted and to close again when the proper pressure is reached and the secondary circuit closed at the electrodes. The next weld takes place upon firing of the ignitron timed with the inductively effective position of the primary and the secondary.

In the above example, an interval of about two seconds between welds was found practical, which provided about a quarter of a second for building up the charge on capacitor C.

It should be understood that the present disclosure is for the purpose of illustration only and that this invention includes all modifications and equivalents which fall within the scope of the appended claims.

I claim:

1. Electric welding apparatus which comprises relatively movable primary and secondary windings operative to induce impulses upon passing through a certain relative position, motor means for driving one of said windings, fly wheel means coupled to said motor means and respective windings, a source of exciting current including capacitor means connected to said primary winding, an adjustable timing switch actuated by said motor means dependent upon said relative position of said windings, a normally open main control switch, relatively movable electrode means connected to said secondary winding, means for moving said electrode means, electric valve means having anode, cathode and control electrode, an excitation circuit including in series connection said anode and said cathode, said capacitor means and said primary winding, a control voltage supply, a valve control circuit including in series connection said cathode, said timing switch, said main control switch, said voltage supply and said control electrode, and means for closing said main switch coincident with a predetermined relative position of said electrodes, for firing said valve means under control of said timing switch and said electrode moving means.

2. Electric welding apparatus which comprises relatively movable primary and secondary windings operative to induce impulses upon passing through a certain relative position, motor means for driving one of said windings, a source of exciting current including capacitor means connected to said primary winding, a timing switch actuated by said motor means dependent upon said relative position of said windings, a normally open main control switch, relatively movable electrode means connected to said secondary winding, means for actuating said electrode means, electric valve means having anode, cathode and control electrode, an excitation circuit including in series connection said anode and said cathode, said capacitor means and said primary winding, a control voltage supply, a valve control circuit including in series connection said cathode, said timing switch, said main control switch, said voltage supply and said control electrode, and means for closing said main switch coincident with a predetermined relative position of said electrodes, for firing said valve means under control of said timing switch and said electrode actuating means.

3. Electric welding apparatus which comprises relatively movable primary and secondary windings operative to induce impulses upon passing through a certain relative position, motor means for driving said primary windings, a source of exciting current including capacitor means connected to said primary winding, a normally open circuit maker between said source and said winding, means for closing said circuit maker to discharge said capacitor means through said primary winding, means for actuating said closing means in dependency upon said relative position of said windings, locking means for rendering said closing means ineffective, relatively movable electrode means connected to said secondary winding, means for moving said electrode means, and means associated with said locking means for rendering said closing means effective in a predetermined relative position of said electrodes.

4. Electric welding apparatus which comprises relatively movable primary and secondary windings operative to induce impulses upon passing through a certain relative position, motor means for driving one of said windings, a source of exciting current including energy-storing means connected to one of said windings, a normally open circuit maker between said source and said winding, means for closing said circuit maker to discharge said source through said winding, means for actuating said closing means in dependency upon said relative position of said windings, locking means for rendering said closing means ineffective, relatively movable electrode means connected to the other winding, means for moving said electrode means, and means associated with said locking means for rendering said closing means effective in a predetermined relative position of said electrodes.

5. A current impulse generating and controlling device which comprises relatively movable primary and secondary windings operative to induce impulses upon passing through a certain relative position, motor means for driving one of said windings, a source of exciting current including energy-storing means connected to said primary winding and means for charging said storing means from said source, a timing switch actuated by said motor means dependent upon said relative position of said windings, electric valve means having anode, cathode and control electrode, an excitation circuit including in series connection said anode and cathode, said storing means and said primary winding, a control voltage supply, and a valve control circuit including in series connection said cathode, said timing switch, said voltage supply and said control electrode, for firing said valve means under control of said timing switch.

6. A current impulse generating and controlling device which comprises relatively movable concentrated primary and secondary windings operative to induce impulses upon passing through a certain relative position, motor means for driving one of said windings, a source of exciting current connected to said primary winding, a timing switch actuated by said motor means dependent upon said relative position of said windings, electric valve means having anode, cathode and control electrode, an excitation circuit including in series connection said anode and cathode, said source and said primary winding, a control voltage supply, and a valve control circuit including in series connection said cathode, said timing switch, said voltage supply and said control electrode, for firing said valve means under control of said timing switch.

7. A current impulse generating and controlling device which comprises relatively movable primary and secondary windings operative to induce impulses upon passing through a certain relative position, motor means for driving one of said windings, a source of exciting current including energy storing means connected to said primary winding, a normally open circuit maker between said source and said primary winding, means for closing said circuit maker to discharge said storing means into said primary, and means for actuating said closing means dependent upon the relative position of said windings.

8. A current impulse generating and controlling device which comprises a concentrated primary winding, a concentrated secondary winding movable relatively to the primary winding, motor means for driving one of said windings, a source of exciting current connected to said primary winding, a normally open circuit maker between said source and said primary winding, means for closing said circuit maker, means for actuating said closing means dependent upon the relative position of said windings, and means for adjusting the effective actuating time of said actuating means relatively to said position.

9. A current impulse generating and controlling device which comprises relatively movable primary and secondary windings operative to induce impulses while passing through a certain relative position, motor means for driving one of said windings, an energy storing source of exciting current connected to said primary winding, a normally open circuit maker between said source and said primary winding, means for closing said circuit maker, and means for actuating said closing means to discharge said source into the primary winding dependent upon said relative position of said windings.

10. Device according to claim 9 wherein said windings are concentrated.

11. Device according to claim 9 wherein said actuating means is adjustable to vary said dependency upon the winding position.

12. Device according to claim 9 wherein said source comprises capacitor means arranged for discharge into said primary winding.

13. Device according to claim 9 wherein said primary and secondary windings are linked by an iron free magnetic circuit.

14. Device according to claim 9 wherein said primary and secondary windings are linked by a magnetic circuit containing iron.

15. Device according to claim 9 wherein said circuit maker can be retained open independently of said actuating means.

16. Device according to claim 9 wherein said motor drives said primary and said secondary is stationary.

17. For use in current generating and controlling devices, an impulse inductor comprising a rotatable shaft, a first concentrated winding mounted on said shaft, a second concentrated winding mounted substantially symmetrical to said shaft, a normally disconnected energy storing source arranged for energization of said first winding, and circuit making means for applying energization impulses to said first winding from said source in timed relationship to the relative position of said windings.

18. Inductor according to claim 17 wherein said circuit making means includes means for adjusting the phase of said timed relationship between said energization of said first winding and said relative position.

HAROLD J. GRAHAM.

REFERENCES CITED

The following references are of record in the file of this patent:

UNITED STATES PATENTS

| Number | Name | Date |
|---|---|---|
| 2,213,090 | Levoy | Aug. 27, 1940 |
| 2,301,424 | List et al. | Nov. 10, 1942 |
| 2,302,748 | Da Roza et al. | Nov. 24, 1942 |
| 2,390,774 | Burgwin | Dec. 11, 1945 |
| 2,473,927 | White | June 21, 1949 |